United States Patent
Ling et al.

(10) Patent No.: US 6,335,504 B1
(45) Date of Patent: Jan. 1, 2002

(54) APPARATUS FOR MONITORING SPOT WELDING PROCESS AND METHOD OF THE SAME

(75) Inventors: Shih-Fu Ling; Li-Xue Wan, both of Singapore (SG)

(73) Assignee: Essor International Inc., Taichung (TW)

(*) Notice: Subject to any disclaimer, the term of this patent is extended or adjusted under 35 U.S.C. 154(b) by 0 days.

(21) Appl. No.: 09/736,263

(22) Filed: Dec. 15, 2000

(51) Int. Cl.[7] ............................................. B23K 11/25
(52) U.S. Cl. .................................................. 219/109
(58) Field of Search ................................. 219/109, 110

(56) References Cited

U.S. PATENT DOCUMENTS 4,963,830 A * 10/1990 Roth et al. .................. 219/109
5,436,422 A * 7/1995 Nishiwaki et al. .......... 219/110
6,140,825 A * 10/2000 Fujii et al. .................. 219/110

* cited by examiner

*Primary Examiner*—Clifford C. Shaw
(74) *Attorney, Agent, or Firm*—Bacon & Thomas, PLLC

(57) ABSTRACT

The present invention discloses an apparatus and a method for monitoring the quality of a spot welding process. The measured electric current and voltage signals between electrodes of a spot welding system are converted into digital data first. Then the two digital data are processed to obtain their complex forms via Hillbert transform respectively to construct their imaginary part. Finally, the electrical impedance $Z_{in}$ is obtained from dividing the complex form of digital voltage by the complex form of digital current. The electrical impedance $Z_{in}$ can be applied to compare with historical data to diagnose the quality of spot-welding points.

9 Claims, 5 Drawing Sheets

APPARATUS FOR MONITORING SPOT WELDING PROCESS AND METHOD OF THE SAME

BACKGROUND OF THE INVENTION

1. Field of the Invention

The present invention relates to an apparatus and a method for monitoring a spot welding process and, more particularly, to a diagnosing apparatus and a method used for monitoring spot welding quality of sheet metal fabrication of automotive, appliance, aerospace industries, etc.

2. Description of Related Art

Resistance spot welding (RSW) is a process that takes advantage of the work-piece's inherent resistance to the flow of electrical current in order to join overlapped metal sheets. RSW involves interaction of electrical, thermal, mechanical, metallurgical and surface phenomena. It has been widely used in joining metal sheets, such as those found in automotive, appliance, and aerospace industries because it requires no filler metals and has only local effects to the properties of the metal sheets being welded.

A typical sequence for RSW is presented in FIG. 6. As shown in FIG. 6, during the squeezing time, an upper electrode is pressed with a controllable static pressure against the work-pieces sitting on another lower electrode held by workers or fixtures. Then during welding time, a pre-set electric current flows through the electrodes and two-overlapped work-pieces and fusion takes place. Afterwards, in holding time, the current flow is shut off yet application of the static pressure through electrodes is sustained. In this holding period, the molten weld is allowed to consolidate as it solidifies. The pressure exerted further introduces a forging effect that enhances mechanical properties. In the last phase, the electrodes are released. The system is then ready for the next welding cycle.

According to a prior art, a more accepted method of quality monitoring for spot welding is to measure the secondary electrical resistance as shown in FIG. 7. The "dynamic electrical resistance" is obtained from dividing the peak or ems value of each half cycle of the measured voltage by the peak or ems value of the measured current in the corresponding half cycle. Because there are only two data points per cycle and that the voltage and current values employed in the division do not occur at the same instant, the resulted resistance record is only an approximation of the reality. Furthermore, the phase difference information between voltage and current is completely lost in the method of the prior art.

Therefore, it is desirable to provide an improved apparatus and method for monitoring the quality of spot welding process to mitigate and/or obviate the aforementioned problems.

SUMMARY OF THE INVENTION

The object of the present invention is to provide an apparatus and a method for monitoring the quality of a spot welding process in-situ, so as to diagnose the welding quality of spot welded joint in near real-time.

To achieve the objective, the apparatus for monitoring the quality of the welding process of a spot-welding system primarily comprises a current measuring device, a voltage measuring device, at least one analog to digital converter, a processing unit, and an output unit.

The current measuring device and the voltage measuring device are provided to respectively measure the electrical current and voltage signals between a pair of electrodes of the spot-welding system in every desired time interval t. The measured current and voltage signals are then converted into digital current i(t) and digital voltage v(t) by the at least one analog to digital converter. The processing unit serves for calculating an electrical impedance ($Z_{in}$) between the electrodes of the spot-welding system according to the equation:

$$Z_{in} = \frac{V(t)}{I(t)},$$

wherein $V(t)=v(t)+jH(v(t))$, and $I(t)=i(t)+jH(i(t))$.

The V(t) is a complex form of the digital voltage v(t) having an imaginary part H(v(t)) obtained by Hillbert transform equation:

$$H(v(t)) = \frac{1}{\pi t} * v(t).$$

The I(t) is a complex form of the digital current i(t) having an imaginary part H(i(t)) obtained by Hillbert transform equation:

$$H(i(t)) = \frac{1}{\pi t} * i(t).$$

The electrical impedance ($Z_{in}$) calculated by the processing unit is then output by the output unit, which can be a displaying device to display the electric impedance ($Z_{in}$).

The apparatus of the present invention may optionally comprise a data analyzer and a memory unit, so that the data analyzer may compare a newly obtained electrical impedances ($Z_{in}$) with historical data stored in the memory unit. The historical data are related to one of different quality results of a spot-welding process, such as an electrical impedance corresponding to a well-welded point, a poor-welded point, or a joint formed with expulsion, etc. The newly obtained impedance can be compared with these historical data and the conclusions of comparisons can then be displayed by the output unit or an indicator of the apparatus to reveal the quality of the welding joint. The indicator can be an LED, or any other substantial device, for lighting up when the electric impedance ($Z_{in}$) coincides with one of the historical data.

Furthermore, the process unit can be made smarter for diagnosing abnormalities if so detected. Electrical impedance curves obtained from the welding processes carried out under various good and ill settings of welding parameters are obtained and stored in the memory unit automatically for comparison later. Through proper statistical or neural network pattern recognition schemes, the pattern of a newly obtained electrical impedance can be recognized. The output unit can then display the results of diagnosis, i.e., the recognized pattern of the impedance curve.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
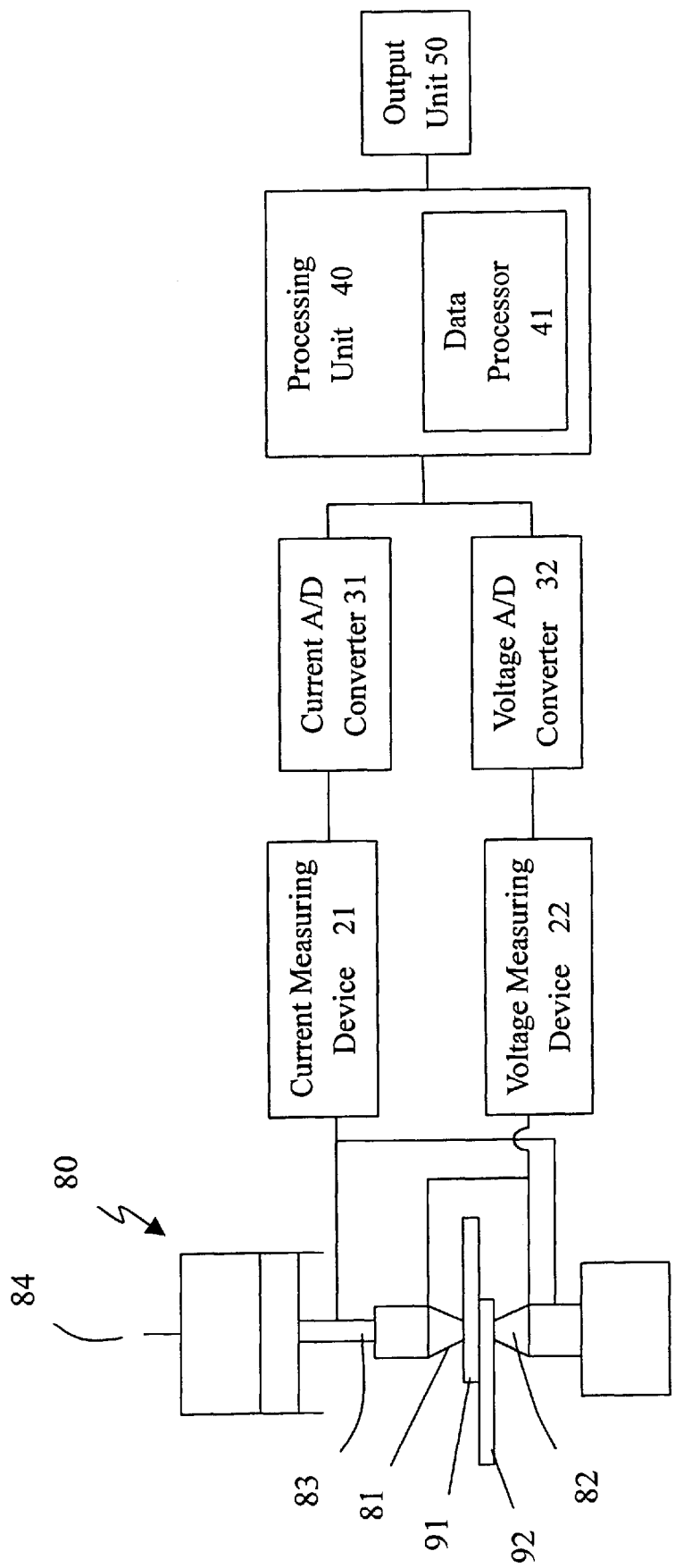
FIG. 1 shows a block diagram of an embodiment of the present invention.

Referring to FIG. 1, a spot-welding system 80, for example a spot-welding gun, includes a pressing rod 83, and an actuator 84 provided to actuate the pressing rod 83. Accordingly, electric current is then inducted through a pair of electrodes 81, 82 onto two metal sheets 91, 92 wherein the electrode 81 is connected to the pressing rod 83. The electric current and voltage signals between the two electrodes 81, 82 are measured in analog type first by a current measuring device 21 and a voltage measuring device 22 respectively in every desired time interval t.

In order to obtain further information, the measured analog signals are then converted into digital current i(t) and digital voltage v(t) by a current analog to digital converter 31 and a voltage analog to digital converter 32. The digital voltage v(t) and digital current i(t) of the present invention are then processed into their complex forms of:

$$I(t)=i(t)+jH(i(t)), \text{ and}$$

$$V(t)=v(t)+jH(v(t))$$

in the processing unit 40, wherein the imaginary part $H(i(t))$ and $H(v(t))$ respectively represent the Hilbert transform of the digital current i(t) and the digital voltage v(t), and are obtained from the equations of:

$$H(i(t)) = \frac{1}{\pi t} * i(t),$$

and $$H(v(t)) = \frac{1}{\pi t} * v(t).$$

The Hilbert transform of current i(t) and voltage v(t) are very well-known as to shift a phase angle of signal by −90°. After being transformed into complex form, the following calculation becomes possible for evaluating the input impedance ($Z_{in}$) by a data processor 41 in the processing unit 40 according to the equation of:

$$Z_{in} = \frac{V(t)}{I(t)}.$$

Since the denominator, I(t), is in its complex form, the calculated input impedance ($Z_{in}$) will always be meaningful in every time interval t. Note that the sampling rate can always be set higher in order to obtain more accurate results.

In order to avoid the possible signal distortion caused by higher harmonic components, the signals may be filtered by a band-pass filter centered at the main operation frequency first to eliminate the higher harmonics before performing the Hilbert transform.

Figure 2A:
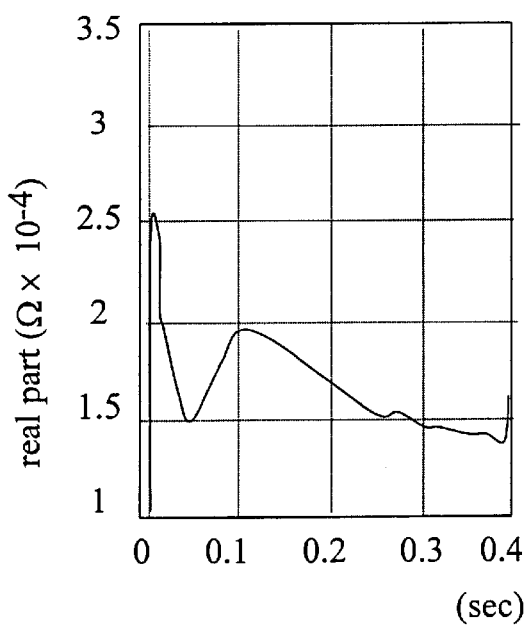
FIGS. 2(a) and 2(b) are curves of real part and imaginary part of the electrical impedance obtained by the present invention from a welding process.
Figure 2B:
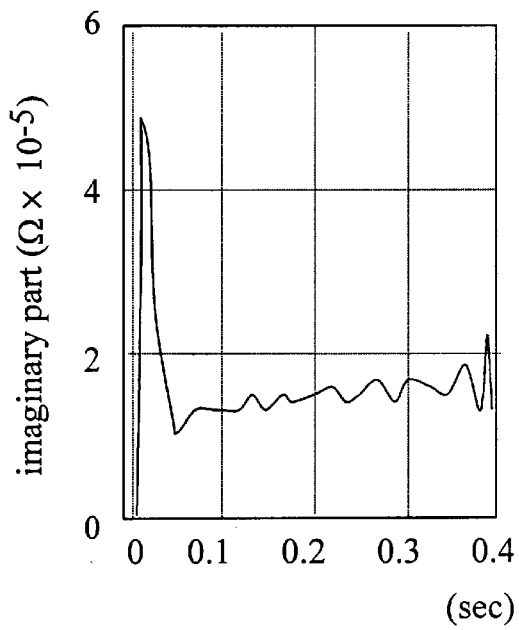
Figure 3:
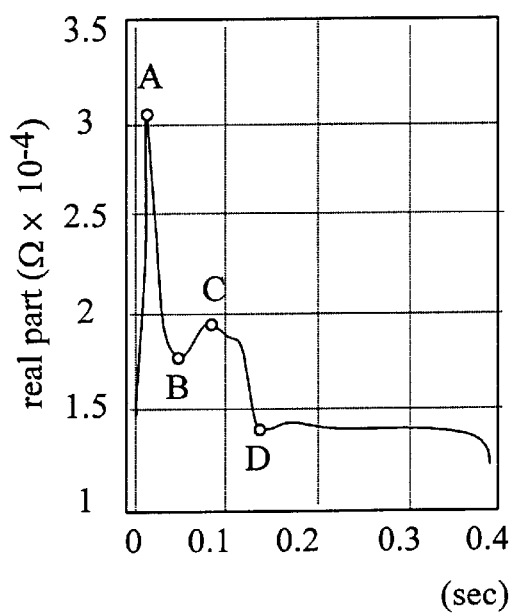
FIG. 3 is another curve of the real part of the electrical impedance obtained by the present invention from another welding process.

The real part of $Z_{in}$ represents the variations of the real electrical resistance along time. FIGS. 2(a) and 2(b) indicate the real part and imaginary part of the electrical impedance of the spot-welding system 80 operating at a pre-set condition of welding pressure 150 Kpa, welding current 4200 A, and welding time 0.4 sec. Both curves of real and imaginary parts of the impedance can be used to describe the behavior of the welding system. For example, in the real part shown in FIG. 2(a), the sharp dropping in resistance after the initiation of welding indicates that a good contact between metal sheets 91, 92 starts to achieve after the metal sheets soften due to the heat generated by the resistance. At the moment of trough, the metal sheets 91, 92 have been welded together to an appreciable degree. After the trough, the resistance slightly rises almost linearly to a peak when the welding nugget is gradually forming its best shape. After this peak, the resistance falls gradually until the end of the spot welding when indentation is being formed. FIG. 3 shows another curve of the real part of the electrical impedance obtained in another welding parameter setting of welding pressure 125 Kpa, welding current 6500 A, and welding time 0.4 sec. After the trough and peak shown in FIG. 3, the sudden dropping of the resistance indicates that expulsion takes place.

The calculated electrical impedance $Z_{in}$ is displayed by a displaying device 50, which can display numbers or show curves of the impedance as FIGS. 2(a), 2(b) or 3 in a CRT.

Additionally, the calculated results, either the real or imaginary part of the electrical impedances $Z_{in}$, can be used to monitor the quality of welding joints.

Figure 4:
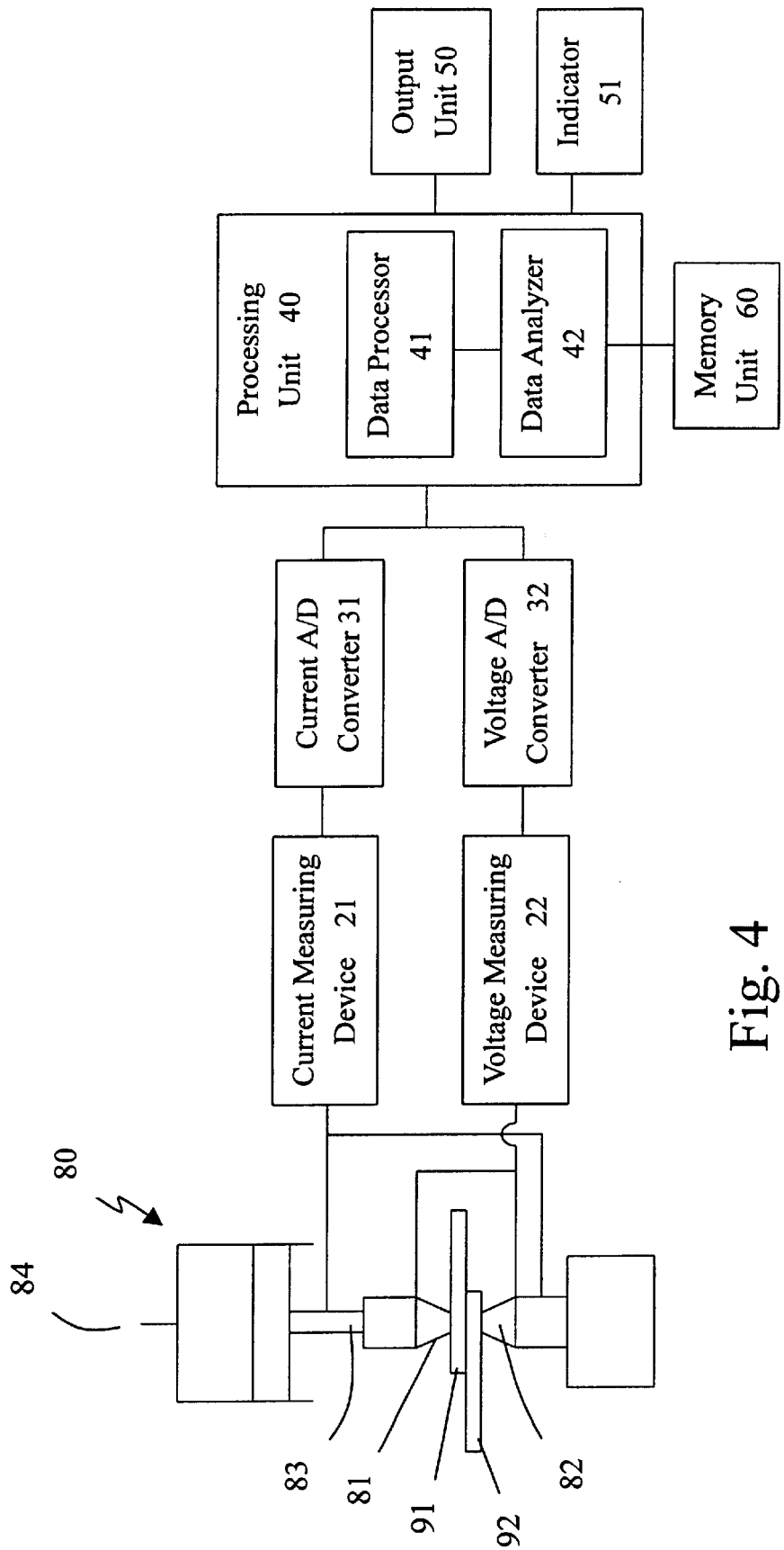
FIG. 4 shows a block diagram of an alternative embodiment of the present invention.
Figure 5:
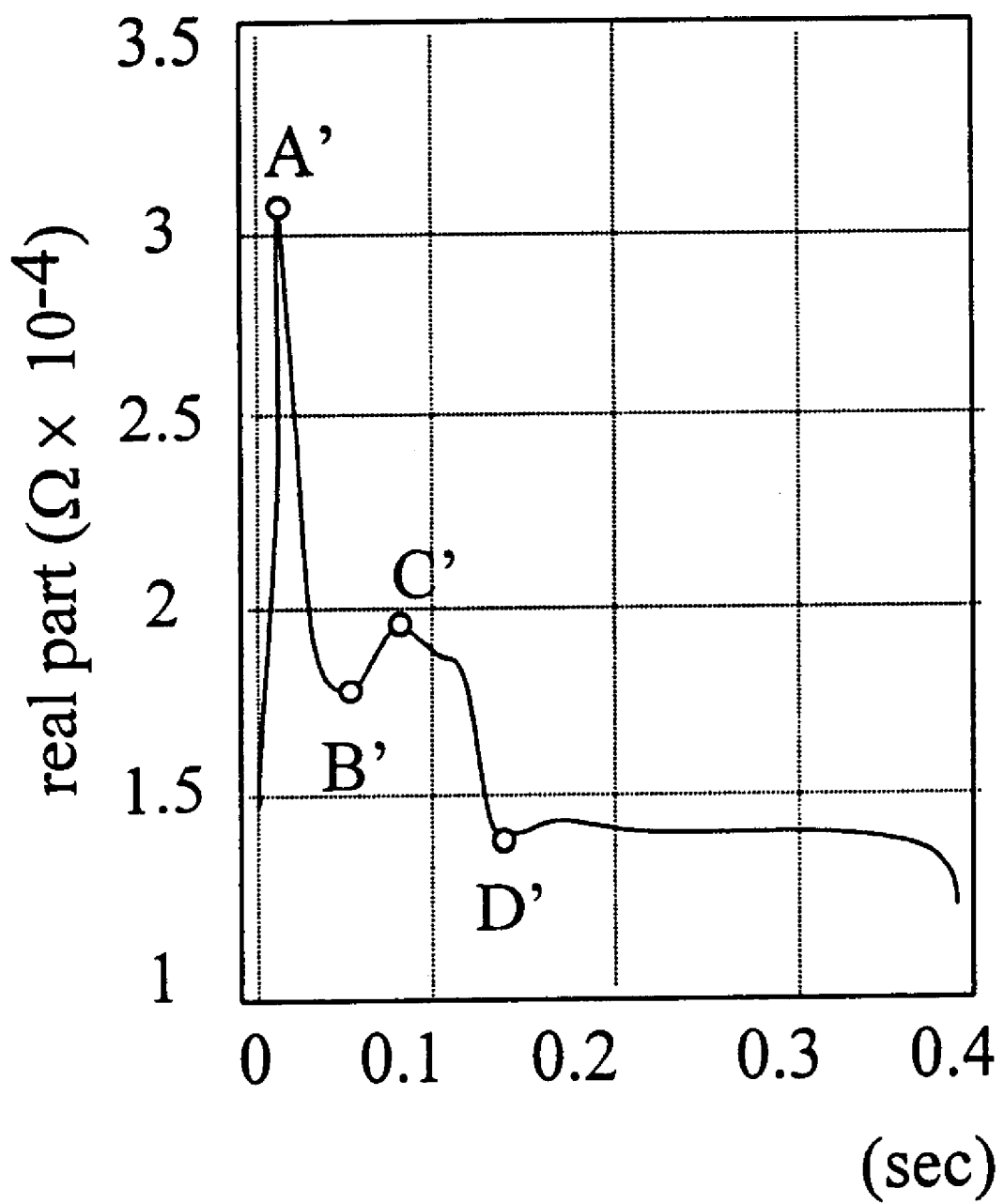
FIG. 5 is a curve sample pattern of the real part of the electrical impedance when the welding joint is formed with expulsion.
Figure 6:
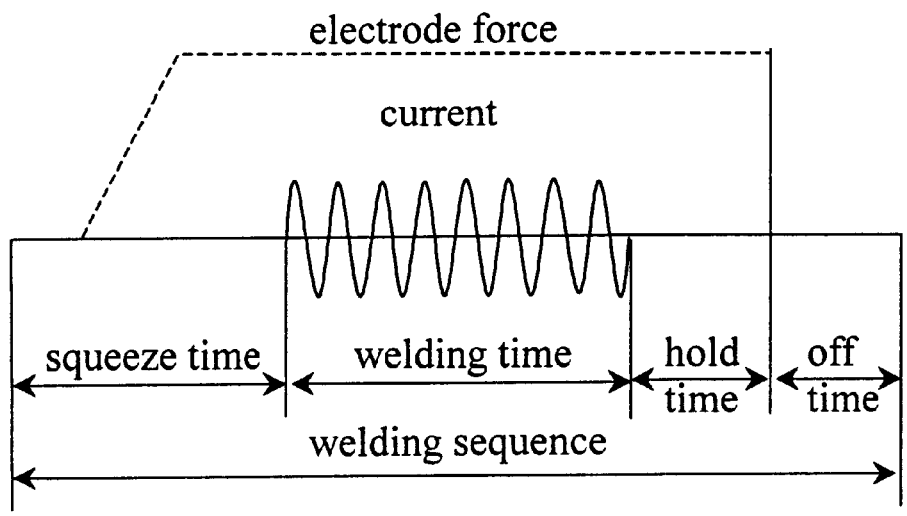
FIG. 6 shows the sequence of a typical resistance spot welding (RSW) process.
Figure 7:
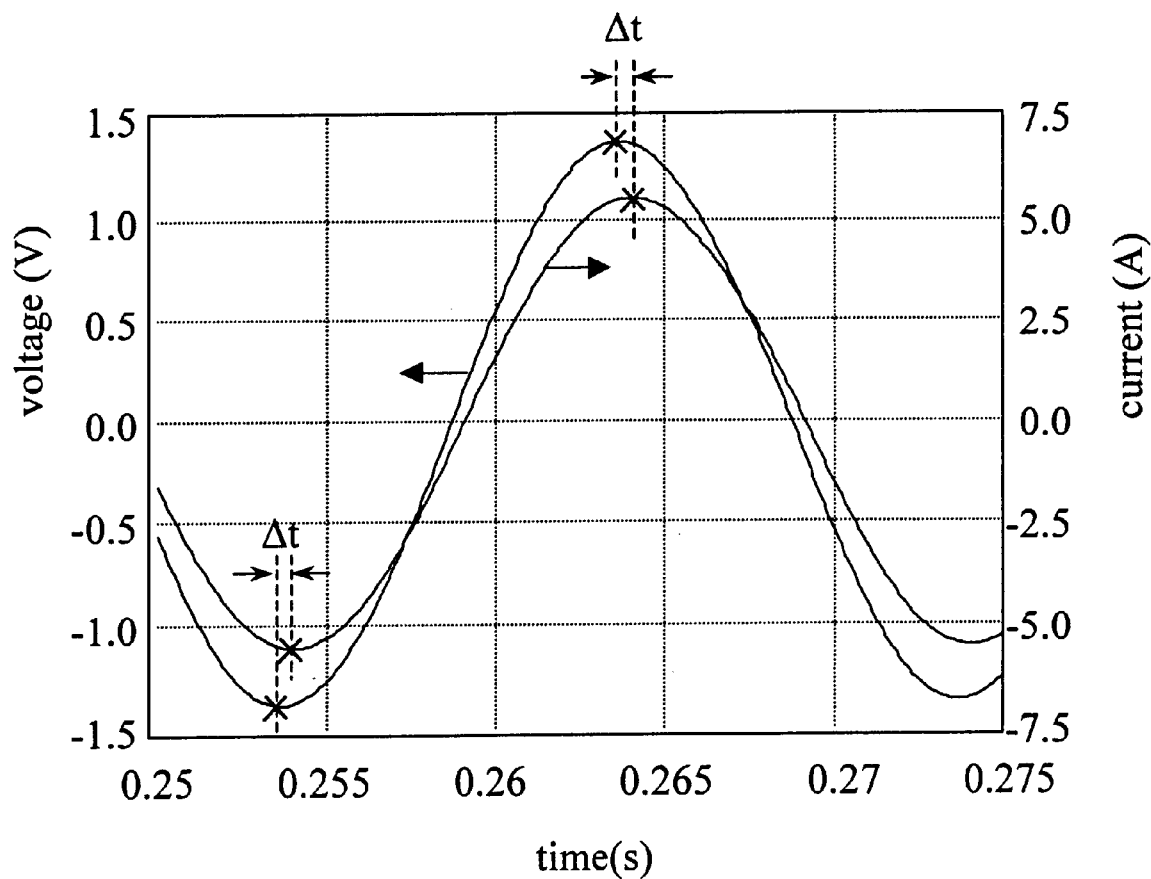
FIG. 7 shows the phase difference between a measured voltage and current signal happening in a spot welding process of a prior art.

FIG. 4 shows a block diagram of an alternative embodiment, in which the data processor 41 and a data analyzer 42 are included in the processing unit 40 and an indicator 51 is connected. The data analyzer 42 can compare either (or both) the real or (and) imaginary part of calculated results with a set of historical data stored in a memory unit 60 or imported by man. For example, the features of the historical impedance data of typical joints with good bonding strength, poor bonding strength and formed with expulsion, such as the amplitude and time of points A', B', C', D' from FIG. 5, can be stored in memory unit 60 in advance. After a new pattern of the electrical impedances $Z_{in}$ of a welding process is calculated with the present method, the data analyzer 42 compares the newly obtained impedance with those features stored in the memory unit 60 to decide the quality of the new joint. The indicator 51, such as a red LED, will display to indicate which of the three joints, good bonding strength, poor bonding strength, or bonding with expulsion, has just been formed. Since the measuring and calculations takes little time, the quality indication can be used by the operator to manually decide an appropriate action before the next spot welding is made.

Alternatively, the data analyzer 42 can be made smarter for diagnosing quality problems of welding joints if so detected. Electrical impedance curves obtained from the welding processes carried out under various good and ill settings of welding parameters are obtained and stored in the memory unit 60 automatically for comparison later. Through proper statistical or neural network pattern recognition schemes, the pattern of a newly obtained electrical impedance can be recognized. The output unit 50 can then display the results of diagnosis, i.e., the recognized pattern of the impedance curve.

Furthermore, since the time required for measuring and processing is short, the obtained information contained in the electrical impedance can be analyzed and used as the input of a controller which can automatically control the welding machine for correction of the quality problems from an overall viewpoints.

Further still, the quality of welds of a welding machine collected as described earlier can be stored in the data analyzer 42 can be analyze to provide statistical information about the productivity and quality of the particular machine.

Although the present invention has been explained in relation to its preferred embodiment, it is to be understood that many other possible modifications and variations can be made without departing from the spirit and scope of the invention as hereinafter claimed.

What is claimed is:

1. An apparatus for monitoring a welding process of a spot-welding means, said spot-welding means including a pair of electrodes; said apparatus comprising:

a current measuring means for measuring electric current signal between said electrodes;

a voltage measuring means for measuring electric voltage signal between said electrodes;

at least one analog to digital converter for converting said measured current and voltage signals into digital current i(t) and digital voltage v(t);

a processing unit for calculating an electrical impedance ($Z_{in}$) between said electrodes of said spot-welding means according to the equation:

$$Z_{in} = \frac{V(t)}{I(t)},$$

wherein, $$V(t)=v(t)+jH(v(t)),$$
   $$I(t)=i(t)+jH(i(t)),$$

said V(t) being a complex form of said digital voltage v(t) having an imaginary part H(v(t)) obtained by Hillbert transform equation:

$$H(v(t)) = \frac{1}{\pi t} * v(t),$$

said I(t) being a complex form of said digital current i(t) having an imaginary part H(i(t)) obtained by Hillbert transform equation:

$$H(i(t))\frac{1}{\pi t} * i(t); \text{ and}$$

an output unit for outputting said electrical impedance ($Z_{in}$) of said processing unit.

2. The apparatus as claimed in claim 1 further comprising a data analyzer and a memory means, said data analyzer using for comparing said electrical impedance ($Z_{in}$) with historical data stored in said memory means, said historical data related to different quality results of a spot-welding process.

3. The apparatus as claimed in claim 2, wherein said historical data being an electrical impedance corresponding to a joint formed with expulsion.

4. The apparatus as claimed in claim 2 further comprising an indicator for showing a comparing conclusion when said electrical impedance ($Z_{in}$) coincides with said historical data.

5. The apparatus as claimed in claim 1, wherein said output unit comprising a displaying device for displaying said electric impedance ($Z_{in}$).

6. A method for monitoring a welding process of a spot-welding means, said spot-welding means including a pair of electrodes; said method comprising steps of:

(a) measuring electrical current signal and voltage signal between said electrodes of said spot-welding means, and converting the same to digital current i(t) and digital voltage v(t) respectively;

(b) calculating an electrical impedance ($Z_{in}$) between said electrodes of said spot-welding means with the equation:

$$Z_{in} = \frac{V(t)}{I(t)},$$

wherein, $$V(t)=v(t)+jH(v(t)),$$
   $$I(t)=i(t)+jH(i(t)),$$

said V(t) being a complex form of said digital voltage v(t) having an imaginary part H(v(t)) obtained by Hillbert transform equation:

$$H(v(t)) = \frac{1}{\pi t} * v(t),$$

said I(t) being a complex form of said digital current i(t) having an imaginary part H(i(t)) obtained by Hillbert transform equation:

$$H(i(t))\frac{1}{\pi t} * i(t); \text{ and}$$

(c) outputting said electric impedance ($Z_{in}$).

7. The method as claimed in claim 6 further comprising step (d) after said step (c), comparing said electrical impedance ($Z_{in}$) with historical data, said historical data related to different quality results of a spot-welding process.

8. The method as claimed in claim 7, wherein said historical data being an electrical impedance corresponding to a joint form with expulsion.

9. The method as claimed in claim 7 further comprising step (e) after said step (d), showing a comparing conclusion when said electrical impedance ($Z_{in}$) coincides with said historical data.

* * * * *